Figures 1, 2:
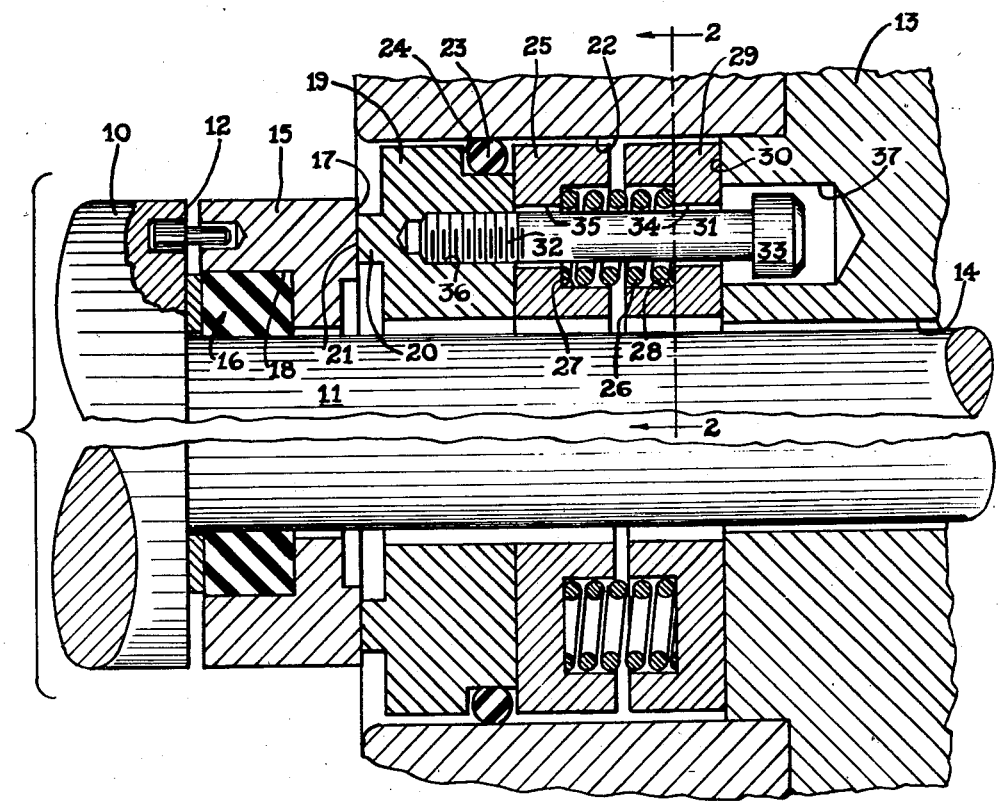

Oct. 9, 1951     S. A. HASTINGS     2,571,035

ROTARY "O" RING SEAL FOR ROLL-NECKS

Filed Jan. 29, 1948

INVENTOR

Shirrel A. Hastings

BY Charles F. Voytech

Patented Oct. 9, 1951

2,571,035

UNITED STATES PATENT OFFICE 2,571,035

ROTARY "O" RING SEAL FOR ROLL-NECKS

Shirrel A. Hastings, Chicago, Ill., assignor to Crane Packing Company, Chicago, Ill., a corporation of Illinois Application January 29, 1948, Serial No. 5,122

3 Claims. (Cl. 286—11.14)

This invention relates to rotary seals which are adapted to effect a seal on a radially disposed plane. For purposes of illustration, it will be described as applied to a roll-neck of a rolling mill, but its use is not limited to such apparatus.

It is important on steel mill rolls to prevent the lubricant in the roll-supporting bearing from contacting the steel being rolled and also to prevent the water used to clean the steel from reaching the bearings. Roll-necks, from which the rolls are supported, are of large size such that ordinary seals used for this purpose are difficult to obtain and expensive to make. Since rolls must be dressed frequently, it is necessary to remove the rolls from the chocks or bearing supports, and this means that the seal must be removed likewise. The seals commonly in use are destroyed when they are removed, which increases the maintenance costs of the mill. Special seals have been proposed which are not destroyed when removed, but these seals are expensive to make.

The principal object of this invention is to provide a seal for a steel mill roll or the like which seal is removable without being in any way impaired by the removal and which is comparable in cost to the seals now in use.

A more specific object of this invention is to simplify the construction of a mechanical seal of the type which uses radially disposed sealing surfaces so that a minimum number of parts is used and the price can accordingly be reduced.

These and other objects and features of this invention will become apparent from the following detailed description when taken together with the accompanying drawings, in which Fig. 1 is a section through a seal embodying the features of this invention; and Fig. 2 is a fragmentary elevation taken along line 2—2 of Fig. 1, showing the disposition of the springs used in the seal.

Referring now to the drawings for a specific description of the invention, there is shown a roll 10 having a neck portion 11 extending axially therefrom, said neck being of reduced diameter so as to form with roll 10 a shoulder 12. Said neck 11 is supported from a chock 13 by means of suitable bearings (not shown) located to the right of the portion of the chock shown in Fig. 1, said chock having an opening 14 therein through which the neck 11 extends.

The seal by which water is kept from the bearings and the lubricant in the bearings is kept from the rolls, is comprised of a seat washer 15 resiliently mounted on neck 11 through the intermediary of a ring 16 of resilient deformable material such as rubber, either natural or synthetic or a combination of the two, so that said seat washer 15 is sealed with respect to neck 11. Ring 16 abuts on shoulder 12 and is located on neck 11 thereby. Seat washer 15 is formed with a radially disposed surface 17 which is suitably ground and lapped or otherwise finished so as to be perfectly flat and smooth. Ring 16 is initially under compression in a recess 18 in washer 15 so that washer 15 is constrained to rotate and move with neck 11. Because of the flexibility of ring 16, washer 15 can assume a plurality of positions such that if it is not initially located on ring 16 with surface 17 normal to the axis of rotation, it can be made to assume such normal position by exerting suitable axial pressure on surface 17.

The movable portion of the seal is comprised of a sealing washer 19 made from a material which will have a low coefficient of friction when run against the material of washer 15 and will at the same time have long wearing qualities. Said sealing washer 19 is provided with an axially extending bead 20 which in turn is formed with a radially disposed surface 21 abutting on surface 17 of washer 15. The surface 21 is ground and lapped so as to be perfectly flat and smooth and, when running against surface 17, forms a fluid-tight seal therewith.

Sealing washer 19 is disposed in a recess 22 formed in chock 13 and is sealed with respect to recess 22 by means of an endless ring 23 having a circular radial cross-section. Said ring 23 is preferably made from a resilient deformable material such as rubber or the like, either natural or synthetic or a combination of the two, and is commonly known to the trade as an O ring. It is understood, of course, that other endless rings of resilient packing material can likewise be used, but I have found that this type of ring is particularly well adapted for use in seals of this character. Ring 22 is received in a recess 24 formed in the upper right-hand corner (Fig. 1) of sealing washer 19. The diameter of the cylindrical portion of the recess 24 is such with respect to the diameter of recess 22 and the thickness of ring 23 that said ring is initially under compression when the seal is installed and hence a fluid-tight seal is formed between chock 13 and sealing washer 19.

In order to confine O ring 23 in recess 24, a rigid washer 25 is disposed directly adjacent washer 19, said washer 25 having an outside diameter which is substantially the same as the outside diameter of washer 19. Thus washer 25 forms with recess 24 a groove in which O ring 23 can operate. The axial dimension of the groove is preferably made larger than the axial dimension of ring 23 when it is compressed so that said ring 23 can roll in the recess to a limited extent and therefore free itself if it should adhere either to washer 19 or wall 22.

Washer 25 is maintained in its position adjacent washer 19 by a plurality of helical springs 26, one end of each of which is located in a circular recess 27 formed in ring 25. The opposite end of each spring is located in a similar recess 28 formed in a washer 29 abutting on the vertical wall 30 of recess 22. For ease of manufacture, washer 29 may be identical with washer 25 in every respect. It will be oberved that springs 26 will maintain a constant pressure upon washer 25 which in turn will transmit the pressure to sealing washer 19 and thereby hold said sealing washer 19 in contact with sealing washer 15. Inasmuch as each of the sealing washers 15 and 19 is sealed with respect to its support, it will be apparent that a fluid-tight seal is established between chock 13 and roll neck 11.

It sometimes occurs that the resistance to rotation developed between surfaces 17 and 21 is sufficiently great to overcome the resistance to rotation developed between washer 19 and O ring 23, or between O ring 23 and recess 22, and hence instead of having a running sliding connection between surfaces 17 and 21, the sliding occurs between the O ring 23 and one of the members with which it is in contact. This of course is desirable and to overcome such difficulty, means are provided to prevent washer 19 from rotating relative to chock 13. This means comprises a plurality of bolts 31 which are threaded at one end 32 and provided with a head 33 at the opposite end. Said bolts pass freely through apertures 34 and 35 in washers 29 and 25 and are threaded into suitably threaded openings 36 in sealing washer 19. Thus bolts 31 are rigidly secured to washers 19 and are movable therewith. If, however, bolts 31 are held against rotation, washer 19 will similarly be held against rotation as well as washers 25 and 29.

Chock 13 is drilled with blind holes 37 to receive the heads 33 of bolts 31. Said holes 37 are sufficiently deep to permit considerable axial movement of sealing washer 19 relative to washer 29. It is contemplated however that the depth of the holes 37 relative to the length of bolts 31 will be such that the heads 33 of the bolts will strike the bottom of blind holes 37 before springs 26 are compressed solidly. This will protect the springs from damage during installation of the seal on a roll-neck. The number of bolts used depends largely on the diameter of the seal and may vary from two to four. The bolts preferably will be passed through certain of the springs 26 so as to form a support therefor and to eliminate the necessity of an additional indexing operation.

The seal is maintained in an assembled relation, whether or not it is installed in a chock, by means of the bolts 31. The seals are assembled by first assembling an O ring 23 over a sealing washer 19 and then a ring 25 is placed adjacent washer 19 with the spring-retaining recesses 27 located on the outside of ring 19. Next, the springs are placed in the recesses and the washer 29 is then placed over the springs, care being taken to insure the proper location of springs 26 in the recesses 28 in washer 29. Care must also be taken to make sure that openings 34, 35 and 36 are in line to receive the bolts 31. The final operation is to insert the bolts 31 into the openings and tighten them in washer 19. The free height of springs 26 is such that bolts 31 can be started in washer 19 and when the bolts are tightened, the springs 26 will be somewhat compressed. The entire seal, however, will then be handled as a unit since washer 29 will be held by the heads 33 of the bolts.

The seal may be removed from recess 22 as often as is necessary, and under normal operation, sealing surface 21 should not require any attention for about a year. If, however, either surface 21 of sealing washer 19, or O ring 23 require servicing or replacement, this can readily be done simply by unscrewing bolts 31. The remainder of the seal, of course, need not be replaced and can be used indefinitely.

As further protection against compressing the springs 26 solidly, the recesses 27, 28 in which the springs are retained are made sufficiently deep so that their combined axial dimension is greater than the solid height of the springs. This means that washers 25 and 29 will come together before the springs are compressed to their solid height. The deep recesses also insure proper retention of the springs in the recesses when washer 29 abuts on heads 33 of bolts 31.

It is understood that the foregoing description is illustrative of preferred embodiments of this invention and that the scope of the invention is not to be limited thereto, but is to be determined by the appended claims.

What is claimed is:

1. A sealing device for relatively rotatable elements. said device comprising a sealing washer, a ring spaced axially from the washer and disposed coaxially with respect thereto, a plurality of axially disposed openings in the ring, resilient means interposed between the washer and ring and tending to separate said washer and ring, a plurality of pins, each secured at one end to the washer and passing through the openings in the ring and each pin having a head larger than the opening to limit the movement of the pin through the opening, means for flexibly sealing the washer with respect to one of said elements, said one element having recesses into which the heads of the pins project, whereby said washer is adapted to move axially relative to the said one element but is locked against rotation with respect thereto.

2. A sealing device for relatively rotatable elements, said device comprising a sealing washer, a pair of axially spaced rings concentrically disposed with respect to the washer and adjacent thereto, said rings having aligned openings, pins passing through the openings and secured at one end to the washer, said pins being freely movable in the openings, a head on at least one pin at the free end thereof, said head being larger than the opening so as to retain the rings on the pin, resilient means compressed between the rings to urge said rings apart and supply sealing pressure, and flexible deformable sealing means connecting the washer and one of the said elements to form a fluid-tight seal between the washer and the said one element, said one element having an opening into which the head is slidable to prevent relative rotation between the washer and said one element.

3. A sealing device for relatively rotatable elements, said device comprising a sealing washer having a shoulder thereon, a ring adjacent the washer and forming a groove with the shoulder, a similar ring spaced from the first-mentioned ring, spring means compressed between the rings and tending to separate them, pins passing through the rings, said pins being free to move relative to the spaced ring, said pins being fixed at one end to the washer and having an abutment on the other end contacted by the said similar ring to retain the rings on the pins, sealing means in the groove formed by the shoulder and ring and effective to form a fluid-tight joint with one of said rotatable elements, said one of said rotatable elements having recesses to receive the said other ends of the pins, whereby to form an axially slidable, rotary driving connection with at least one of the pins, and thus to prevent relative rotation between the sealing washer and said one element.

SHIRREL A. HASTINGS.

REFERENCES CITED

The following references are of record in the file of this patent:

UNITED STATES PATENTS

| Number | Name | Date |
|---|---|---|
| 1,066,711 | Cook | July 8, 1913 |
| 1,859,436 | Durdin | May 24, 1932 |
| 2,405,464 | Storer | Aug. 6, 1946 |

FOREIGN PATENTS

| Number | Country | Date |
|---|---|---|
| 348,374 | Great Britain | of 1931 |
| 409,778 | Great Britain | of 1934 |